US011210054B2

(12) United States Patent
Cho et al.

(10) Patent No.: US 11,210,054 B2
(45) Date of Patent: Dec. 28, 2021

(54) ELECTRONIC APPARATUS AND CONTROL METHOD THEREOF FOR PERFORMING AUTOMATIC VOLUME-LEVEL CONTROL

(71) Applicant: SAMSUNG ELECTRONICS CO., LTD., Suwon-si (KR)

(72) Inventors: Jae-youn Cho, Suwon-si (KR); Sun-min Kim, Yongin-si (KR); Ki-beom Kim, Yongin-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 0 days.

(21) Appl. No.: 16/754,929

(22) PCT Filed: Oct. 1, 2018

(86) PCT No.: PCT/KR2018/011640
§ 371 (c)(1),
(2) Date: Apr. 9, 2020

(87) PCT Pub. No.: WO2019/074227
PCT Pub. Date: Apr. 18, 2019

(65) Prior Publication Data
US 2020/0293267 A1    Sep. 17, 2020

(30) Foreign Application Priority Data
Oct. 11, 2017 (KR) .......................... 10-2017-0131464

(51) Int. Cl.
*G06F 3/16* (2006.01)
(52) U.S. Cl.
CPC .................. *G06F 3/165* (2013.01)

(58) Field of Classification Search
None
See application file for complete search history.

(56) References Cited

U.S. PATENT DOCUMENTS 8,306,241 B2    11/2012  Kim et al.
2005/0264705 A1*  12/2005  Kitamura ............. H04N 21/439
                                                       348/738
(Continued)

FOREIGN PATENT DOCUMENTS

JP    2002-358716        12/2002
JP    2003087142 A  *   3/2003
(Continued)

OTHER PUBLICATIONS

English machine translation of JP 2003087142 (Year: 2003).*
(Continued)

*Primary Examiner* — James K Mooney
(74) *Attorney, Agent, or Firm* — Nixon & Vanderhye, P.C.

(57) ABSTRACT

The disclosure relates to an electronic apparatus including: a user input unit; an audio output unit; and a processor configured to identify whether a changing pattern of audio volume levels is present based on a history of the audio volume levels set by a user for a predetermined period of time, perform automatic volume-level control, by which an audio volume level of the audio output unit is controlled based on the changing pattern of the audio volume levels, based on presence of the corresponding pattern, and perform no automatic volume-level control, based on absence of the changing pattern of the audio volume levels.

20 Claims, 14 Drawing Sheets

(56) References Cited

U.S. PATENT DOCUMENTS

| | | | |
|---|---|---|---|
| 2007/0053528 A1 | 3/2007 | Kim et al. | |
| 2011/0095875 A1* | 4/2011 | Thyssen ................... | G09G 5/10 340/407.1 |
| 2012/0039489 A1 | 2/2012 | Chen et al. | |
| 2014/0078404 A1 | 3/2014 | Cheung | |
| 2016/0056782 A1* | 2/2016 | Lee ..................... | H04M 1/6058 381/107 |

FOREIGN PATENT DOCUMENTS

| | | |
|---|---|---|
| JP | 2003-283956 | 10/2003 |
| JP | 2005-268866 | 9/2005 |
| JP | 2008-61062 | 3/2008 |
| JP | 2014140124 A * | 7/2014 |
| KR | 10-2006-0055035 | 5/2006 |
| KR | 10-2012-0103928 | 9/2012 |
| KR | 10-2014-0084367 | 7/2014 |
| KR | 10-2016-0138726 | 12/2016 |
| KR | 10-2017-0103539 | 9/2017 |

OTHER PUBLICATIONS

English machine translation of JP 2014140124 (Year: 2014).*
International Search Report for PCT/KR2018/011640 dated Jan. 21, 2019, 5 pages.
Written Opinion of the ISA for PCT/KR2018/011640 dated Jan. 21, 2019, 7 pages.
Office Action dated Sep. 24, 2021 in counterpart KR Application No. 10-2017-0131464 and partial English-language machine translation.

* cited by examiner

FIG. 8

INFORMATION ABOUT PRESENCE OF PERIODICITY — 801

| | 1H | 2H | 3H | 4H | 5H | 6H | 7H | 8H | 9H | 10H | 11H | 12H | 13H | 14H | 15H | 16H | 17H | 18H | 19H | 20H | 21H | 22H | 23H | 24H |
|---|---|---|---|---|---|---|---|---|---|---|---|---|---|---|---|---|---|---|---|---|---|---|---|---|
| SUN | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| MON | 0 | 0 | 0 | 0 | 0 | 0 | 0 | 0 | 0 | 1 | 0 | 0 | 0 | 1 | 1 | 0 | 0 | 0 | 0 | 0 | 0 | 0 | 0 | 0 |
| TUE | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| WED | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| THUR | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| FRI | 0 | 0 | 0 | 0 | 0 | 0 | 0 | 0 | 0 | 0 | 0 | 1 | 0 | 1 | 0 | 0 | 0 | 0 | 0 | 0 | 0 | 0 | 0 | 1 |
| SAT | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

INFORMATION ABOUT ESTIMATED VOLUME LEVEL — 802

| | 1H | 2H | 3H | 4H | 5H | 6H | 7H | 8H | 9H | 10H | 11H | 12H | 13H | 14H | 15H | 16H | 17H | 18H | 19H | 20H | 21H | 22H | 23H | 24H |
|---|---|---|---|---|---|---|---|---|---|---|---|---|---|---|---|---|---|---|---|---|---|---|---|---|
| SUN | 00 | 00 | 00 | 00 | 00 | 00 | 00 | 00 | 00 | 00 | 00 | 6.5 | 00 | 00 | 00 | 00 | 00 | 00 | 00 | 00 | 00 | 00 | 00 | 00 |
| MON | 00 | 00 | 00 | 00 | 00 | 00 | 00 | 00 | 00 | 6.0 | 00 | 00 | 00 | 0.3 | 6.3 | 00 | 00 | 00 | 00 | 00 | 00 | 00 | 00 | 00 |
| TUE | 00 | 00 | 00 | 00 | 00 | 00 | 00 | 00 | 00 | 11.0 | 00 | 00 | 00 | 00 | 00 | 00 | 10.5 | 00 | 00 | 00 | 00 | 00 | 00 | 00 |
| WED | 00 | 00 | 00 | 00 | 00 | 00 | 00 | 00 | 00 | 00 | 00 | 00 | 00 | 00 | 00 | 00 | 00 | 8.3 | 00 | 00 | 00 | 00 | 00 | 00 |
| THUR | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| FRI | 00 | 00 | 00 | 00 | 00 | 00 | 00 | 00 | 00 | 00 | 00 | 1.8 | 00 | 6.3 | 00 | 00 | 00 | 00 | 00 | 00 | 00 | 00 | 00 | 6.8 |
| SAT | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |

| | 1401 | 1402 | 1403 | 1404 | | |
|---|---|---|---|---|---|---|
| Week 1 | 1H CONTENT | 2H CONTENT | 3H CONTENT | 4H CONTENT | ••• | 24H CONTENT |
| SUN | | | | | | |
| MON | | | | | | |
| TUE | | | | | | |
| WED | | | | | | |
| THUR | | | | | | |
| FRI | | | | | | |
| SAT | | | | | | |

| | | 1H | 2H | 3H | 4H | | 24H |
|---|---|---|---|---|---|---|---|
| Week 2 | | CONTENT | CONTENT | CONTENT | CONTENT | ••• | CONTENT |
| SUN | | OFF | | | | | |
| MON | | | | | | | |
| TUE | | | | | | | |
| WED | | | | | | | |
| THUR | | | | | | | |
| FRI | | | | | | | |
| SAT | | | | | | | |

| | 1H | 2H | 3H | 4H | | 24H |
|---|---|---|---|---|---|---|
| Week 3 | CONTENT | CONTENT | CONTENT | CONTENT | ••• | CONTENT |
| SUN | | | | | | |
| MON | | | | | | |
| TUE | | | | | | |
| WED | | | | | | |
| THUR | | | | | | |
| FRI | | | | | | |
| SAT | | | | | | |

| | 1H | 2H | 3H | 4H | | 24H |
|---|---|---|---|---|---|---|
| Week 4 | CONTENT | CONTENT | CONTENT | CONTENT | ••• | CONTENT |
| SUN | OFF | | | | | |
| MON | | | | | | |
| TUE | | | | | | |
| WED | | | | | | |
| THUR | | | | | | |
| FRI | | | | | | |
| SAT | | | | | | |

ELECTRONIC APPARATUS AND CONTROL METHOD THEREOF FOR PERFORMING AUTOMATIC VOLUME-LEVEL CONTROL

This application is the U.S. national phase of International Application No. PCT/KR2018/011640 filed Oct. 1, 2018 which designated the U.S. and claims priority to Korean Patent Application No. 10-2017-0131464 filed Oct. 11, 2017, the entire contents of each of which are hereby incorporated by reference.

TECHNICAL FIELD

The disclosure relates to an electronic apparatus and a control method thereof, and more particularly an electronic apparatus capable of performing automatic volume-level control and a control method thereof.

BACKGROUND ART

Users often change a volume level while using an electronic apparatus capable of outputting a sound. In particular, users frequently perform a variety of control, such as channel switching, volume control, menu settings, etc. while watching a television (TV). Among them, the volume control is one of the most frequently performed control. According to a recent survey, TV viewers carry out the volume control over an average of 12 times per hour, and watch a TV with volume levels different in association with timeslots.

Like this, users frequently change the volume level while using an electronic apparatus, and such frequent volume control is inconvenient for users and obstructs the users' immersion in a service provided by the electronic apparatus.

SUMMARY

Accordingly, an aspect of the disclosure is to provide an electronic apparatus which is convenient and easy for a user to adjust a volume level.

According to an embodiment of the disclosure, there is provided an electronic apparatus including: a user input unit; an audio output unit; and a processor configured to identify whether a changing pattern of audio volume levels is present based on a history of the audio volume levels set by a user for a predetermined period of time, perform automatic volume-level control, by which an audio volume level of the audio output unit is controlled based on the changing pattern of the audio volume levels, based on presence of the corresponding pattern, and perform no automatic volume-level control, based on absence of the changing pattern of the audio volume levels. Thus, the electronic apparatus of the disclosure automatically performs the volume control based on a user's volume-level control pattern so that a volume level can be automatically controlled based on the identified pattern, and therefore a user does not need to manually control the volume in person. Thus, it is possible to ease a user's trouble and effort, thereby improving convenience and immersion in use. Further, a phenomenon, which is inconvenient for a user as the volume control is mechanically performed even though the automatic volume-level control is inadequate, is prevented.

The processor may be configured to identify whether the audio volume levels are patterned in a certain cycle with respect to predetermined unit times, and perform the automatic volume-level control based on a pattern present with respect to a unit time corresponding to a current point in time, corresponding to operation of the electronic apparatus carried out in the current point in time. Thus, it is possible to rapidly identify presence of periodicity for identifying a pattern, a length of the cycle, and a unit time having a pattern.

The processor may be configured to identify that there is a pattern when a deviation among a plurality of volume levels corresponding to a certain cycle and a predetermined unit time is not greater than a predetermined value.

The processor may be configured to identify presence of a pattern based on a result of applying Fourier transform to the history of the audio volume levels.

The processor may be configured to identify the certain cycle based on a result of applying Fourier transform to the history of the audio volume levels, and adjust the predetermined value based on the identified certain cycle. Thus, it is possible to improve the reliability of the pattern identification.

The processor may be configured to identify the pattern based on an audio volume level of similar content in the history of the audio volume levels. Thus, the volume-level history information of when different kinds of content is reproduced is identified as noise, and excluded when a pattern is identified, thereby improving the reliability of the pattern identification.

The processor may be configured to adjust the predetermined value based on similarity of content. Thus, the pattern identification criterion is adjusted according to the similarity of the content at the pattern identification, thereby improving the reliability of the pattern identification.

The electronic apparatus may further include a microphone, and the processor may identify the pattern based on the history of the audio volume levels adjusted corresponding to ambient noise measured using the microphone. Thus, the pattern is identified after controlling the volume level based on the ambient noise measured by the microphone or the like, and therefore accuracy of data used as a criterion of identifying the pattern is improved, thereby improving the reliability of the identified pattern.

The processor may be configured to identify the pattern by excluding some pieces of information from information about the history of the audio volume levels according to whether the electronic apparatus is in a preset operation state. Thus, the pattern is identified under the condition that information unrelated to a user's setting intention is excluded from the history of the audio volume levels, thereby improving the reliability of the pattern identification.

According to an embodiment of the disclosure, there is provided an method of controlling an electronic apparatus, including: identifying whether a changing pattern of audio volume levels is present based on a history of the audio volume levels set by a user for a predetermined period of time; performing automatic volume-level control, by which an audio volume level of an audio output unit is controlled based on the changing pattern of the audio volume levels, based on presence of the corresponding pattern; and performing no automatic volume-level control, based on absence of the changing pattern of the audio volume levels. Thus, the electronic apparatus of the disclosure automatically performs the volume control based on a user's volume-level control pattern so that a volume level can be automatically controlled based on the identified pattern, and therefore a user does not need to manually control the volume in person. Thus, it is possible to ease a user's trouble and effort, thereby improving convenience and immersion in use. Further, a phenomenon, which is inconvenient for a user as the volume control is mechanically performed even though the automatic volume-level control is inadequate, is prevented.

The method may further include identifying whether the audio volume levels are patterned in a certain cycle with respect to predetermined unit times, and perform the automatic volume-level control based on a pattern present with respect to a unit time corresponding to a current point in time, corresponding to operation of the electronic apparatus carried out in the current point in time. Thus, it is possible to rapidly identify presence of periodicity for identifying a pattern, a length of the cycle, and a unit time having a pattern.

The identifying may include identifying that there is a pattern when a deviation among a plurality of volume levels corresponding to a certain cycle and a predetermined unit time is not greater than a predetermined value.

The identifying may include identifying presence of a pattern based on a result of applying Fourier transform to the history of the audio volume levels.

The method may further include identifying the certain cycle based on a result of applying Fourier transform to the history of the audio volume levels, and adjusting the predetermined value based on the identified certain cycle. Thus, it is possible to improve the reliability of the pattern identification.

The identifying may include identifying the pattern based on an audio volume level of similar content in the history of the audio volume levels. Thus, the volume-level history information of when different kinds of content is reproduced is identified as noise, and excluded when a pattern is identified, thereby improving the reliability of the pattern identification.

The method may further include adjusting the predetermined value based on similarity of content. Thus, the pattern identification criterion is adjusted according to the similarity of the content at the pattern identification, thereby improving the reliability of the pattern identification.

The electronic apparatus may include a microphone, and the identifying may include identifying the pattern based on the history of the audio volume levels adjusted corresponding to ambient noise measured using the microphone. Thus, the pattern is identified after controlling the volume level based on the ambient noise measured by the microphone or the like, and therefore accuracy of data used as a criterion of identifying the pattern is improved, thereby improving the reliability of the identified pattern.

The identifying may include identifying the pattern by excluding some pieces of information from information about the history of the audio volume levels according to whether the electronic apparatus is in a preset operation state. Thus, the pattern is identified under the condition that information unrelated to a user's setting intention is excluded from the history of the audio volume levels, thereby improving the reliability of the pattern identification.

A computer program according to an embodiment of the disclosure may include a computer program stored in a medium to carry out the control method combined to the electronic apparatus.

The computer program may be stored in a medium of the server and downloadable into the electronic apparatus through a network.

As described above, according to the disclosure, it is possible to ease a user's trouble and effort to adjust a volume level of an electronic apparatus, thereby improving convenience and immersion in use.

BRIEF DESCRIPTION OF THE DRAWINGS

FIG. 8 illustrates an example of pattern-presence information and estimated-volume information according to an embodiment of the disclosure.

FIG. 11 illustrates an example of a volume-level setting history according to still another embodiment of the disclosure.

FIG. 14 illustrates an example of a volume-level setting history according to still another embodiment of the disclosure.

DETAILED DESCRIPTION OF EXAMPLE EMBODIMENTS

Figure 1:
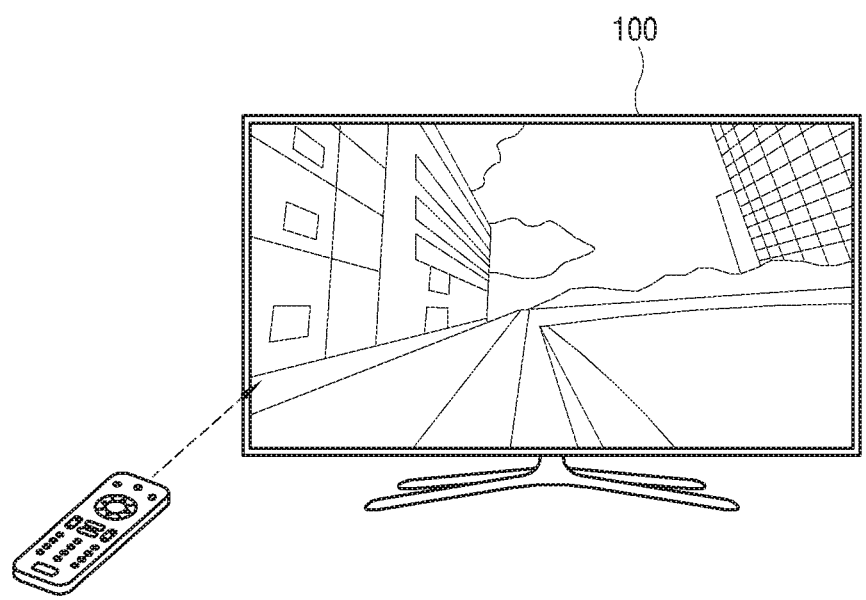
FIG. 1 illustrates an electronic apparatus according to an embodiment of the disclosure.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments. In the following descriptions, details about publicly known technologies or configurations may be omitted if they unnecessarily obscure the gist of the disclosure.

In the following embodiments, terms 'first', 'second', etc. are used only to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module for at least one processor.

FIG. 1 illustrates an electronic apparatus according to an embodiment of the disclosure. The electronic apparatus 100 according to an embodiment of the disclosure may for example be achieved by a loudspeaker, a set-top box, a digital versatile disc (DVD) or Blue-ray disc (BD) player, an audio system, an MP3 player, etc. Further, the electronic apparatus 100 according to another embodiment of the disclosure may for example be achieved by a display apparatus with a display, e.g. a television (TV), a smartphone, a tablet computer, a mobile phone, a smartwatch, a head-mountable display or the like wearable device, a computer, a multimedia player, an electronic frame, a digital billboard, a large format display (LFD), a digital signage, etc. However, the electronic apparatus 100 according to an embodiment of the disclosure is not limited to these examples, but may include any apparatus capable of outputting a sound and receiving a user's input.

Figure 2:
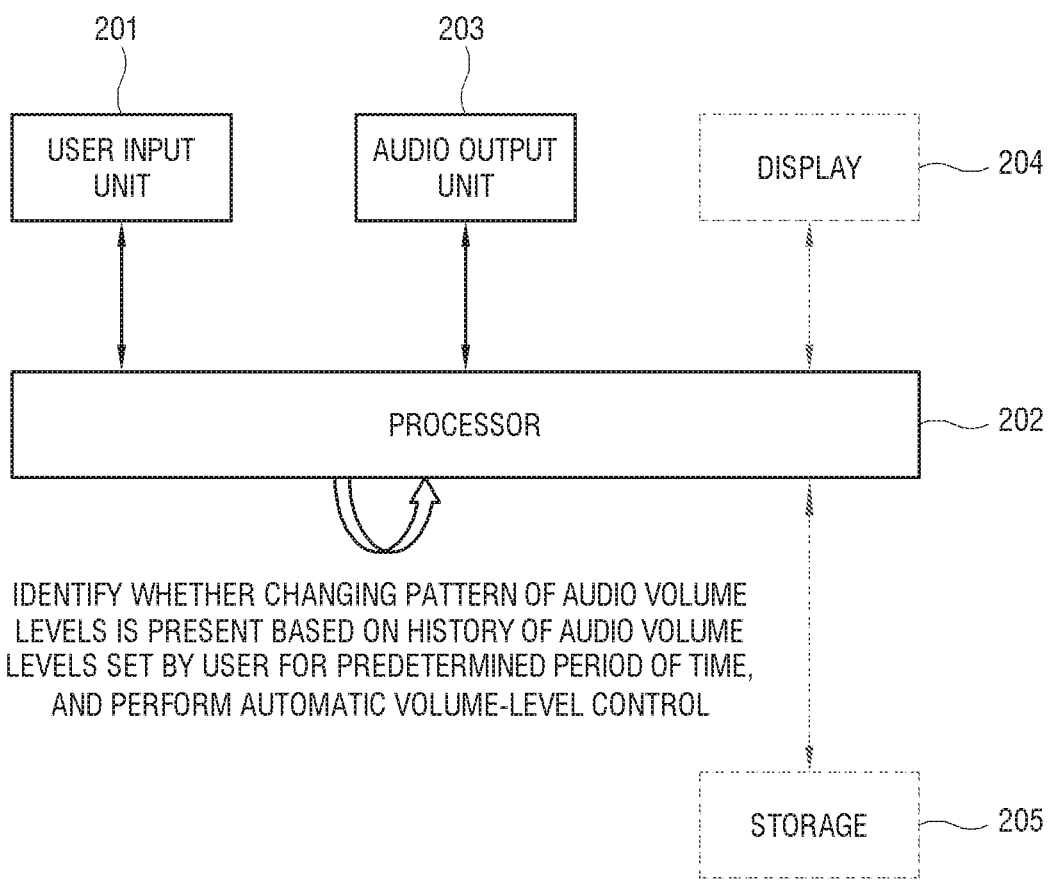
FIG. 2 illustrates a configuration of an electronic apparatus according to an embodiment of the disclosure.

FIG. 2 illustrates a configuration of an electronic apparatus according to an embodiment of the disclosure. The electronic apparatus 100 according to an embodiment of the disclosure includes a user input unit 201, a processor 202, and an audio output unit 203. However, the configuration of the electronic apparatus 100 shown in FIG. 2 is merely an example, and the electronic apparatus according to an embodiment of the disclosure may be achieved by another configuration. That is, the electronic apparatus according to an embodiment of the disclosure may include another element in addition to the configuration shown in FIG. 2, or exclude some elements from the configuration shown in FIG. 2.

The user input unit 201 receives a user's input and transmits it to the processor 202. The user input unit 201 may be achieved in various forms according to a user's input modes. For example, the user input unit 201 may be achieved by a remote-control signal receiver that receives a remote-control signal corresponding to a user's input from a remote controller, a menu button that is installed on an outer side of the electronic apparatus 100, a touch screen that is provided in the display and receives a user's touch input, a camera that detects a user's gesture input, a microphone that recognizes a user's voice input, a keyboard that recognizes a user's key input, etc. The user input unit 201 may receive a user's input for instructing volume setting.

The processor 202 processes an audio signal in response to a user's input received through the user input unit 201, and outputs the processed audio signal to the audio output unit 203. The processor 202 may apply processes such as volume control, amplification, etc. to the audio signal. The processor 202 may be achieved by one or more hardware and/or software modules for performing the foregoing processing, or combination thereof.

The processor 202 may perform control for operating generating elements of the electronic apparatus 100. The processor 202 may include a control program (or instruction) for carrying out the foregoing control operation, a nonvolatile memory in which the control program is installed, a volatile memory to which at least a part of the installed control program is loaded, and at least one processor or central processing unit (CPU) for executing the loaded control program. Further, such a control program may be stored in other electronic devices as well as the electronic apparatus 100.

The control program may include a program(s) achieved in the form of at least one of a basis input/output system (BIOS), a device driver, an operating system, firmware, a platform, and an application program. According to an embodiment, the application program may be previously installed or stored in the electronic apparatus 100 when the electronic apparatus 100 is manufactured, or may be installed in the electronic apparatus 100 based on application program data received from the outside when needed in the future. The application program data may for example be downloaded from an application market or the like external server to the electronic apparatus 100, but there are no limits to downloading the application program data. Meanwhile, the processor 202 may be achieved in the form of a device, an S/W module, a circuit, a chip, etc.

The processor 202 may for example control the user input unit 201 to receive a user's input. The processor 202 applies audio processing to an audio signal, and controls the audio output unit 203 to output a processed sound. Further, both the process and control of the electronic apparatus 100 shown in FIG. 2 are carried out in one processor 202, but this is merely an example. According to an alternative embodiment of the disclosure, the electronic apparatus 100 may include a controller in addition to a processor.

The audio output unit 203 outputs a sound based on an audio signal processed by the processor 202. The audio output unit 203 may be achieved by a loudspeaker. However, the audio output unit 203 is not be limited to the loudspeaker, but may be achieved by any device capable of outputting a sound based on an audio signal. When the audio output unit 203 is the loudspeaker, the loudspeaker may include a plurality of unit loudspeakers provided corresponding to audio data of a plurality of audio channels.

According to an embodiment of the disclosure, the electronic apparatus 100 may further include a display 204 and a storage 205.

The display 204 may display an image together with a sound output from the audio output unit 202. The display 204 may for example be achieved by various display types of liquid crystal, plasma, a light emitting diode (LED), an organic lighting emitting diode (OLED), a surface-conduction electron-emitter, a carbon nano tube, nano crystal, etc. without limitations. When the display 204 is of a liquid crystal type, the display 204 includes a liquid crystal display (LCD) panel, a backlight unit for illuminating the LCD panel, a panel driver for driving the LCD panel, etc. The display 204 may also be achieved by a self-emissive OLED panel without the backlight unit.

The storage 205 may store a variety of data according to process and control of the processor 202. For example, the storage 205 may store an audio volume level set by a user's volume control input. The storage 205 may be accessed by the processor 202, and perform reading, recording, modifying, deleting, updating, etc. with regard to data. The storage 205 may include a nonvolatile memory such as a flash memory, a hard-disc drive, a solid-state drive, etc. to retain data regardless of whether system power of the electronic apparatus 100 is turned on or off. Further, the storage 205 may include a volatile memory such as a buffer, a random access memory (RAM), etc. to which data to be processed by the processor 202 is temporarily loaded.

Figure 3:
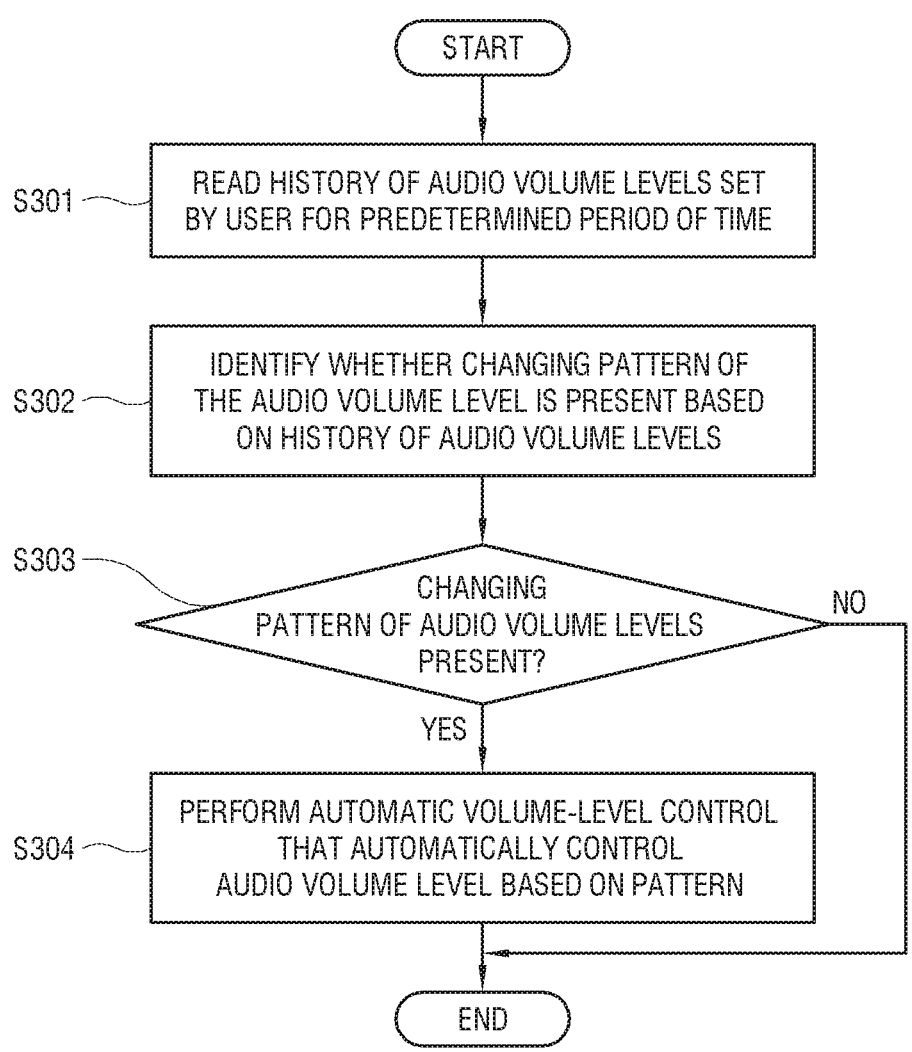
FIG. 3 illustrates a method of controlling an electronic apparatus according to an embodiment of the disclosure.

FIG. 3 illustrates a method of controlling an electronic apparatus according to an embodiment of the disclosure. According to an embodiment of the disclosure, the processor 202 of the electronic apparatus reads a history of audio volume levels set by a user for a predetermined period of time (S301). Here, a predetermined period of time may be variously set in units of week, month, year, or the like term, and is not limited to a specific period. The predetermined period of time may be set by any period as long as it is long enough to identify a pattern or periodicity of a user's volume control.

There may be various examples of the process in which the processor 202 reads the history of the audio volume levels. For example, the processor 202 may directly collect a history of audio volume levels, which are set by a user while using the electronic apparatus 100, and store the history in the storage 205. In this case, the processor 202 may directly read the history of the audio volume level from the storage 205. Alternatively, the processor 202 may receive the history of the audio volume levels from another electronic apparatus or an external server, store the received history in the electronic apparatus, and then read the stored history.

The processor 202 identifies whether a changing pattern of the audio volume levels is present based on the history of the audio volume levels (S302). Here, the pattern may for example refer to a form, a characteristic, a tendency, a type, etc. repeated in a certain cycle. Therefore, when there is a changing pattern of the audio volume levels, it may for example mean a characteristic that change in the audio volume level is repeated in a certain cycle on a time axis.

In terms of identifying whether the change in the audio volume level is patterned for a predetermined period of time, it may be identified whether there is a changing pattern of the audio volume levels throughout the predetermined period of time, and it may be identified whether there is a pattern with regard to a partial period of the predetermined period of time. Here, the partial period may be not a continuous period. The partial period may be a specific timeslot repetitively coming within a predetermined period of time, like at 4 p.m. every Wednesday within one month. When the changing pattern of the audio volume levels is present at such a specific timeslot, the audio volume levels may not be patterned in the other periods.

The processor 202 may for example identify whether the history of the audio volume levels set by a user is repeated in a cycle throughout a predetermined period of time, while adjusting the cycle. By this method, the processor 202 can identify whether there is a changing pattern of the audio volume levels throughout the predetermined period of time. However, there are no limits to the method of identifying whether a pattern is present throughout the predetermined period of time.

A detailed method of identifying whether a pattern is present in a partial period within a predetermined period of time will be described later.

When it is identified that a changing pattern of the audio volume levels is present (YES in S303), the processor 202 performs automatic volume-level control that automatically controls an audio volume level based on the pattern (S304). Thus, the electronic apparatus 100 of the disclosure automatically performs the volume control based on the pattern so that a volume level can be automatically controlled based on the identified pattern, and therefore a user does not need to manually control the volume in person. Thus, it is possible to ease a user's trouble and effort, thereby improving convenience and immersion in use.

Further, according to the disclosure, the automatic volume-level control is carried out only when it is identified that the pattern is present, but not carried out when the pattern is not present. That is, the processor 202 of the electronic apparatus according to an embodiment of the disclosure does not perform the automatic volume-level control when it is identified that the changing pattern of the audio volume levels is not present (No in S303). Thus, a phenomenon, which is inconvenient for a user as the volume control is mechanically performed even though the automatic volume-level control is inadequate, is prevented.

Below, a method of identifying whether a changing pattern of audio volume levels is present in a partial period throughout a predetermined period of time will be described by way of example with reference to FIG. 4.

Figure 4:
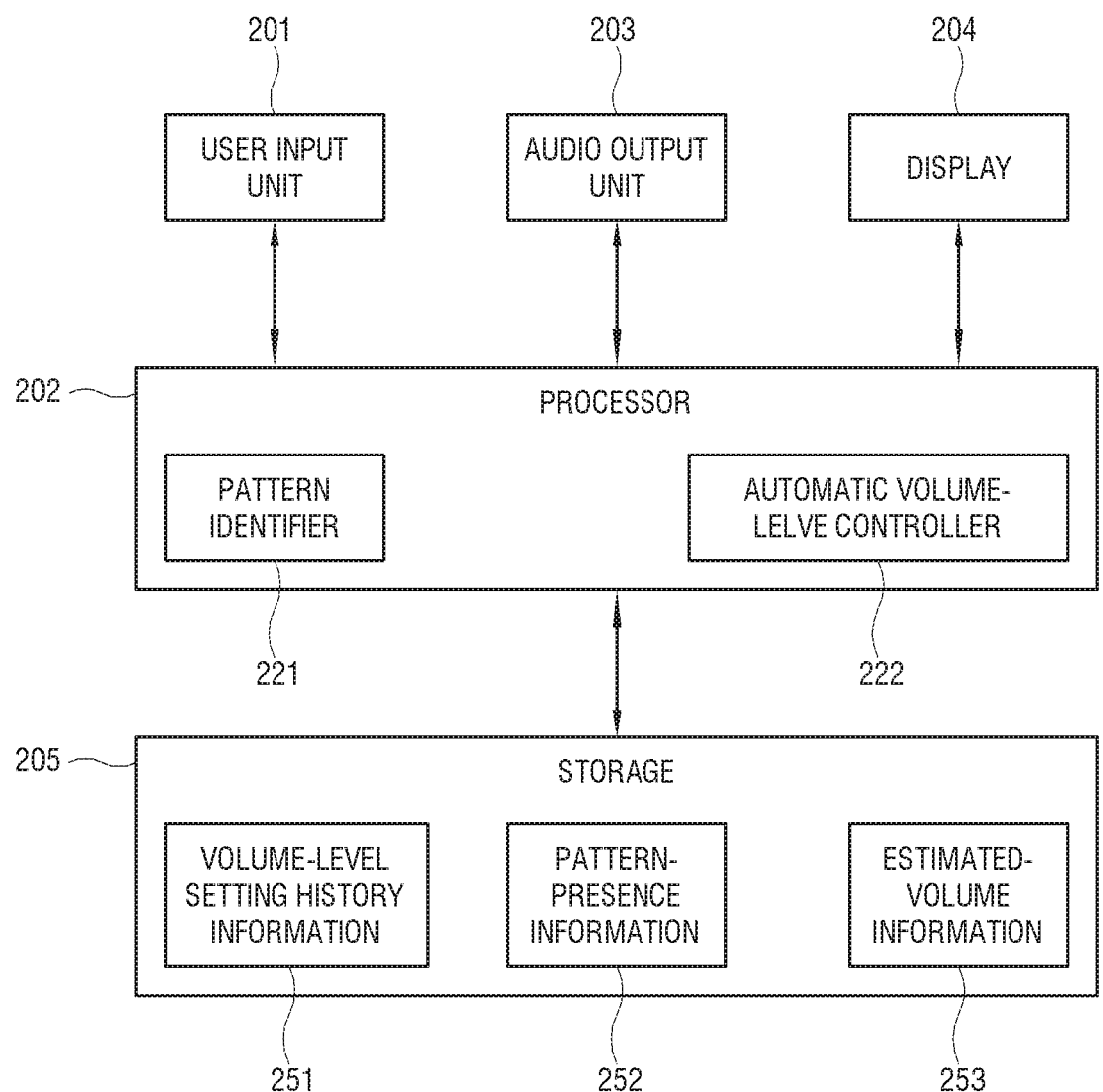
FIG. 4 illustrates a detailed configuration of an electronic apparatus according to an embodiment of the disclosure.

FIG. 4 illustrates a detailed configuration of an electronic apparatus according to an embodiment of the disclosure. According to an embodiment of the disclosure, the processor 202 of the electronic apparatus may include a pattern identifier 221 for identifying whether a pattern is present, and an automatic volume-level controller 222 for performing the automatic volume-level control based on presence of the pattern. The pattern identifier 221, and the automatic volume-level controller 222 may be provided as module-type programs. The modules included in the processor 202 are not limited to the pattern identifier 221 and the automatic volume-level controller 222.

According to an embodiment of the disclosure, the storage 205 of the electronic apparatus may be configured to store volume-level setting history information 251, pattern-presence information 252, and estimated-volume information 253. However, the information stored in the storage 205 is not limited to this embodiment.

The volume-level setting history information 251 refers to information about volume levels stored per unit time with respect to a predetermined unit time as a volume level has been changed for a predetermined period of time. Here, the unit time refers to a specific timeslot repetitively coming within a predetermined period of time, and is used as a basic unit of time to store a volume level. For example, the unit time may be set as one hour, one minute, one second, etc. However, the unit time is not limited to this example. The unit time may be previously set in various units of time according to desired precision of the automatic volume-level control, the throughput of the electronic apparatus, the capacity of the storage, etc. or may be set based on an input.

The volume-level setting history information 251 may store only one volume level or a plurality of volume levels every unit time. When only one volume level is stored as the volume-level setting history information 251 with respect to each unit time, the volume-level setting history information 251 may contain a representative volume level among a plurality of volume levels corresponding to each unit time as a volume level for the corresponding unit time. The representative volume level is regarded as a representative of the volume levels set for the corresponding unit time, and is calculated by taking the volume levels changed for the corresponding unit time into account. For example, an average volume level, the lowest volume level, the highest volume level, etc. set for the corresponding unit time may be stored as the representative volume level.

The pattern identifier 221 identifies whether a changing pattern of the volume levels is present, based on the volume-level setting history information 251 stored in the storage 205.

The processor 202 may generate an identification result of the pattern identifier 221 in the form of the pattern-presence information 252 and store the generated pattern-presence information 252 in the storage 205. The pattern-presence information 252 refers to data indicating whether a changing pattern of the volume levels is present. The pattern-presence information 252 may for example be given in the form of data stored as '1' when it is identified that the changing pattern of the volume levels is present for each unit time, but '0' when it is identified that the changing pattern is not present. However, the stored content, the storing method, and the like are not limited to this example.

Further, as an identification result of the pattern identifier 221, when it is identified that the change in the volume level is patterned with respect to the corresponding unit time, the processor 202 may generate the estimated-volume information 253 containing an estimated volume level with respect to the corresponding unit time based on the pattern and store the estimated-volume information 253 in the storage 205.

The estimated volume level is varied depending on characteristics of a patterned change in a volume level. For example, when it is identified that there is a pattern in which the same volume level is repetitively set in a certain cycle with respect to the corresponding unit time, the estimated volume level for the corresponding unit time may be a volume level stored with respect to the unit time in the previous cycle. Alternatively, when it is identified that there is a pattern in which a volume level is set to be increased or decreased by an equivalent extent in a certain cycle with respect to the corresponding unit time, the estimated volume level for the corresponding unit time may be a volume level obtained by adding or subtracting the foregoing extent to or from the volume level corresponding to the unit time of the previous cycle.

The automatic volume-level controller 222 of the processor 202 carries out the automatic volume-level control based on the estimated-volume information 253 stored in the storage 205 when there is a changing pattern of the volume level with respect to the corresponding unit time. The processor 202 may carry out the automatic volume-level control according to whether an event for performing the automatic volume-level control occurs. For example, the processor 202 may automatically carry out the automatic volume-level control when the corresponding unit time has come, or may carry out the automatic volume-level control in response to a user's command issued for the channel switching or the like in the corresponding unit time.

Below, a detailed method of controlling the electronic apparatus with the foregoing configuration according to an embodiment of the disclosure will be described with reference to FIGS. 5 to 8. For convenience of description, an embodiment in which a predetermined period of time is set as one month and a unit time is set as one hour. In this case, the volume-level setting history information 251 may be given as a table for storing a volume level at every hour for one month, so that the volume level corresponding to each unit time can be stored for a predetermined period of time. For example, as shown in FIG. 7, the volume-level setting history information 251 refers to a table in which days (Sunday to Saturday) and time (1 to 24 hours; 1H, 24H, etc.) are tabulated as shown in FIG. 7, which may include four tables each of which shows the volume-level setting history information with regard to one week.

As described above, there may be various examples of the process in which the processor 202 reads the history of the audio volume levels. Among them, it will be described below that the processor 202 directly collects and stores a history of audio volume levels, which are set by a user while using the electronic apparatus 100, in the storage 205, and directly reads the history of the audio volume levels from the storage 205.

First, it will be described with reference to FIG. 5 that the processor of the electronic apparatus according to an embodiment of the disclosure collects the volume-level setting history information and identifies whether the changing pattern of the audio volume levels is present.

Figure 5:
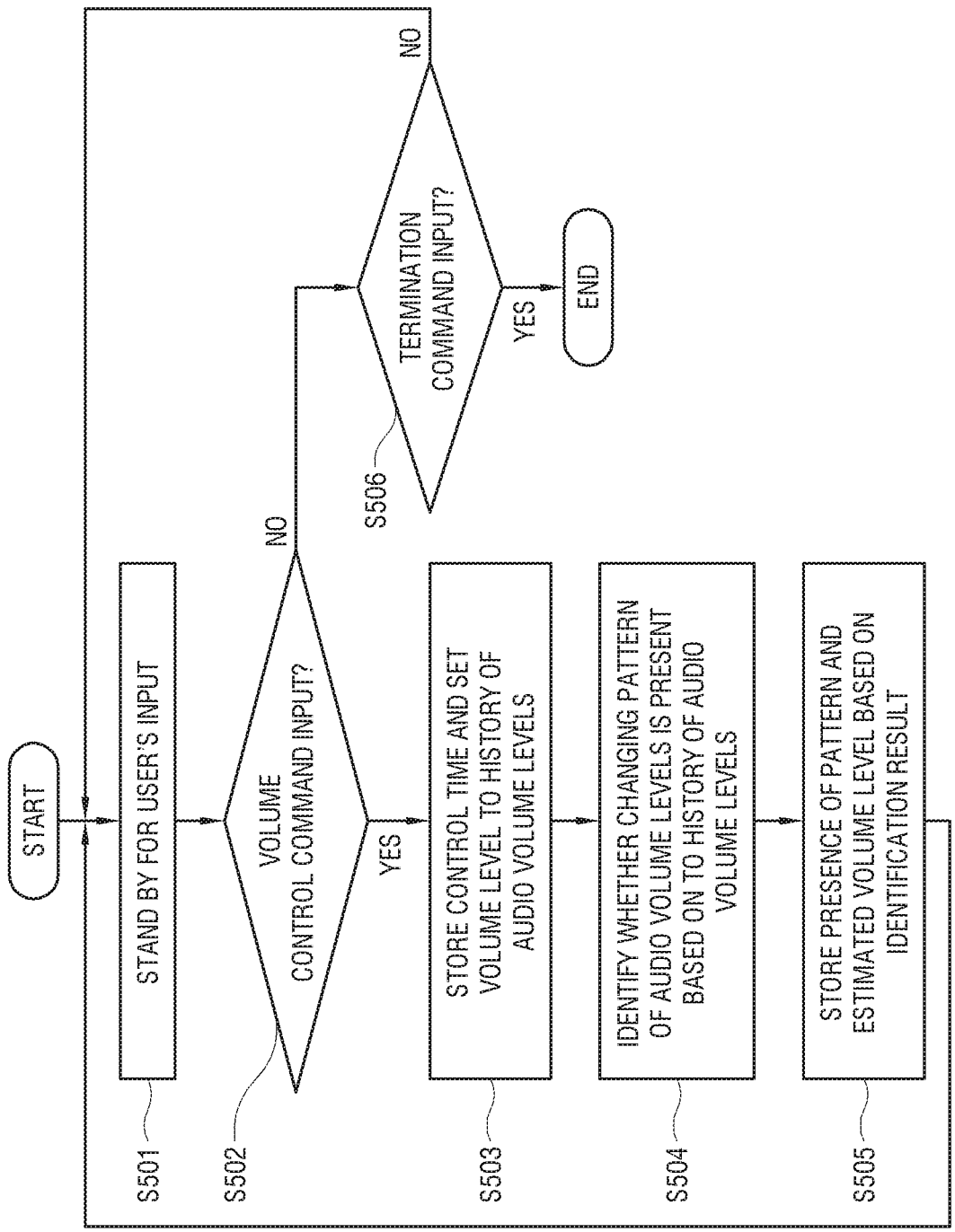
FIG. 5 illustrates an example of a detailed method of controlling an electronic apparatus according to an embodiment of the disclosure.

FIG. 5 illustrates an example of a detailed method of controlling an electronic apparatus according to an embodiment of the disclosure. According to an embodiment of the disclosure, the processor 202 of the electronic apparatus stands by for a user's input (S501). Meanwhile, the processor 202 adds a currently-set volume level to the volume-level setting history information 251 when it enters a new unit time.

In generating the volume-level setting history information 251, the processor 202 may set the volume level corresponding to each unit time based on only one volume level of when it enters the corresponding unit time as, or by additionally reflecting the volume level changed for the unit time. In the latter case, when a user's control command is input to the electronic apparatus though the user input unit 201, the processor 202 identifies whether the control command is a volume control command (S502). When a user inputs the volume control command, the audio output unit 203 of the electronic apparatus 100 may output a sound, or may not output a sound. When a user's control command is the volume control command, the processor 202 adds a control time and a set volume level to the volume-level setting history information 251 (S503). Thus, when a plurality of volume levels corresponds to one unit time, the processor 202 may set only the representative volume level among the plurality of volume levels as the volume level of the corresponding unit time.

Then, the processor 202 identifies whether the changing pattern of the audio volume levels is present based on the above volume-level setting history information (S504), and updates the pattern-presence information based on an identification result (S505). When it is identified that the pattern is present, the estimated-volume information is also stored (S505).

On the other hand, when a user's command input through the user input unit 201 is not the volume control command but a termination command, the processor 202 terminates operation of the electronic apparatus. Otherwise, the processor 202 returns to a standby state for a user's input (S506).

The method of identifying whether the changing pattern of the audio volume levels is present based on the volume-level setting history information employs a statistical characteristic between the volume levels contained in the volume-level setting history information. For example, the processor 202 of the electronic apparatus according to an embodiment of the disclosure identifies that the pattern is present, when a deviation between the plurality of volume levels corresponding to a certain cycle and a predetermined unit time is not greater than a predetermined value.

Here, a predetermined value refers to a criterion for identifying the presence of the pattern when a deviation between the plurality of volume levels corresponding to a certain cycle and a predetermined unit time is within a certain range. The lower the value, the stricter the identification of the pattern. That is, the range of the plurality of volume levels identified as having a pattern becomes narrower as the predetermined value decreases. For example, in an embodiment where a predetermined value of '1.5' is given as the criterion, it is identified that there is a pattern when a standard deviation among four volume levels corresponding to one unit time (for example, 4 p.m.) on Tuesday among pieces of volume level history information corresponding to one month is lower than '1.5', but identified that there are no patterns when the standard deviation is greater than or equal to '1.5'. As compared with this embodiment, the presence of the pattern is more strictly identified in an embodiment where a predetermined value of '1.0' is given as the criterion and it is identified that there is a pattern when a standard deviation among four volume levels corresponding to a unit time of 4 p.m. on Tuesday is lower than '1.5'. In other words, when a predetermined value becomes smaller, it is more difficult to be identified as the presence of the pattern.

As an example of identifying whether there is a changing pattern of the volume levels based on the statistical characteristic, when the volume-level setting history information is generated or collected as shown in FIG. 7, and one week is set as a certain cycle, the processor 202 identifies whether a deviation among a plurality of volume levels (e.g. 701-704) corresponding to a specific day of each week and a specific time is not greater than a predetermined value. When the deviation is smaller than the predetermined value, it is identified that the volume levels set by a user are patterned with respect to the specific day and the specific time. That is, when the deviation is smaller than the predetermined value, a weekly pattern is present with respect to the specific time.

In the foregoing descriptions, one week is given as an example of the certain cycle. However, the certain cycle is not limited to this example, and alternatively a cycle of any time length is possible. Further, the certain cycle for the identification may be set by a user, may be previously set, or automatically or adaptively set by the electronic apparatus.

Below, an example of the pattern-presence information 252 and the estimated-volume information 253 generated by the processor 202 will be described with reference to FIG. 8, according to the embodiment where it is identified that a pattern is present when a deviation among the plurality of volume levels corresponding to a certain cycle and a predetermined unit time is not greater than a predetermined value, based on the volume-level setting history information as shown in FIG. 7.

To identify whether there is a pattern with respect to each unit time, e.g. a weekly pattern, based on the volume-level setting history information as shown in FIG. 7, the processor 202 may identify that the weekly pattern is present with respect to the corresponding unit time when a standard deviation among the plurality of volume levels corresponding to each unit time on a specific day is smaller than a predetermined value, for example, 1.5. By setting the presence of the pattern as '1' but the absence of the pattern as '0' while repeating this process with respect to each unit time on each day, the processor 202 may generate the pattern-presence information in the form of a table as shown in '801' of FIG. 8.

Further, the processor 202 may set the estimated volume level for each unit time in which the presence of the pattern is identified, generate the estimated-volume information 253 based on the set estimated volume levels, and store the estimated-volume information 253 in the storage 205. For example, when the estimated volume level is set with an average value of volume history values corresponding to each unit time with respect to the unit time in which the presence of the pattern is identified, the processor 202 may generate the estimated-volume information in the form of a table as shown in '802' of FIG. 8.

Next, a method that the processor of the electronic apparatus according to an embodiment of the disclosure performs the automatic volume-level control will be described with reference to FIG. 6.

Figure 6:
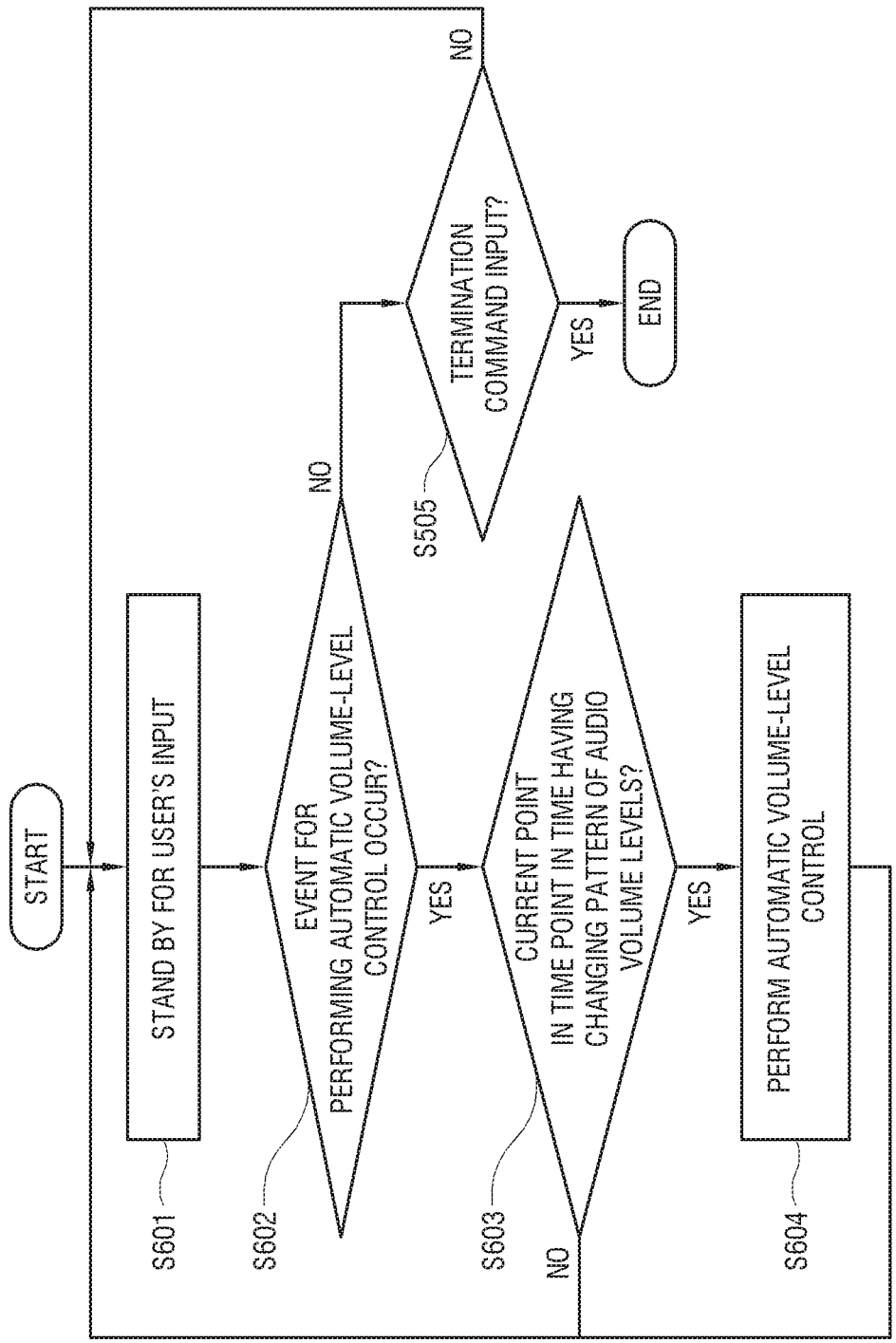
FIG. 6 illustrates another example of a detailed method of controlling an electronic apparatus according to an embodiment of the disclosure.
Figure 7:
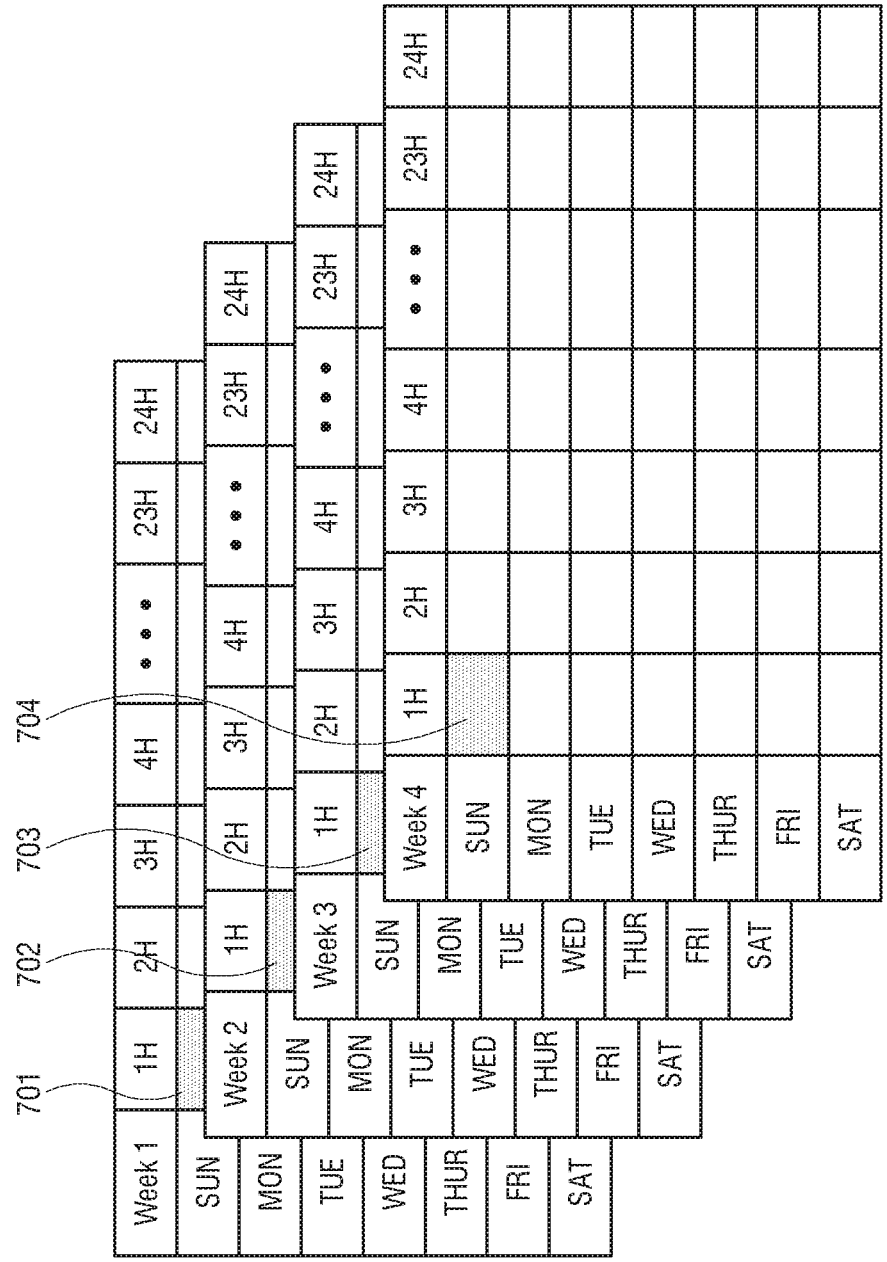
FIG. 7 illustrates an example of a volume-level setting history according to an embodiment of the disclosure.

FIG. 6 illustrates another example of a detailed method of controlling an electronic apparatus according to an embodiment of the disclosure. When the volume-level setting history information 251, the pattern-presence information 252 and the estimated-volume information 253 are generated as shown in FIGS. 7 and 8 through the process shown in FIG. 5, the processor 202 of the electronic apparatus according to an embodiment of the disclosure becomes enabled to perform the automatic volume-level control. In this state, the processor 202 stands by for a user's input (S601). Meanwhile, the processor 202 identifies whether an event for performing the automatic volume-level control occurs (S602). Here, the occurrence of the event for performing the automatic volume-level control refers to a criterion for identifying a situation to carry out the automatic volume-level control. The kind of event may be set or changed by a user, or may be previously set along with the manufacture of the electronic apparatus 100, or the corresponding settings may be received from an external server. As an example of the event for performing the automatic volume-level control, there are cases of when the apparatus is powered on, when a new unit time has come, when an external input is connected to or disconnected to an external input terminal, when content reproduced through the electronic apparatus is changed, when a user command such as a channel switching command, a volume control command, etc. is issued, and so on. However, the events for performing the automatic volume-level control are not limited to these examples.

When it is identified that the event for performing the automatic volume-level control occurs, the processor 202 identifies whether a current point in time is a point in time having a changing pattern of audio volume levels (S603). The processor 202 may identify whether the current point in time is the point in time having a changing pattern of audio volume levels, based on the pattern-presence information 252. For example, when the pattern-presence information is given as shown in '801' of FIG. 8, and the current point in time at which the event for performing the automatic volume-level control occurs corresponds to a unit time at 12:00 on Sunday nit time, the processor 202 may identify that the current point in time is the point in time having a changing pattern of audio volume levels, based on that a value set in the unit time at 12:00 on Sunday is '1' with reference to the pattern-presence information 801. Then, the processor 202 performs the automatic volume-level control (S604). The processor 202 may perform the automatic volume-level control with reference to the estimated-volume information 253. For example, the processor 202 may identify that an estimated volume level corresponding to the current point in time, i.e. the unit time at 12:00 on Sunday is '6.5' with reference to the estimated-volume information 802, and set the audio output unit 203 in the electronic apparatus to have a volume level of '6.5'.

As described above, the processor 202 of the electronic apparatus according to an embodiment of the disclosure identifies whether the audio volume levels are patterned in a certain cycle with respect to a predetermined unit time, and performs the automatic volume-level control when there is a pattern with respect to the unit time corresponding to the current point in time, according to the operation of the electronic apparatus performed in the current point in time.

Figure 9:
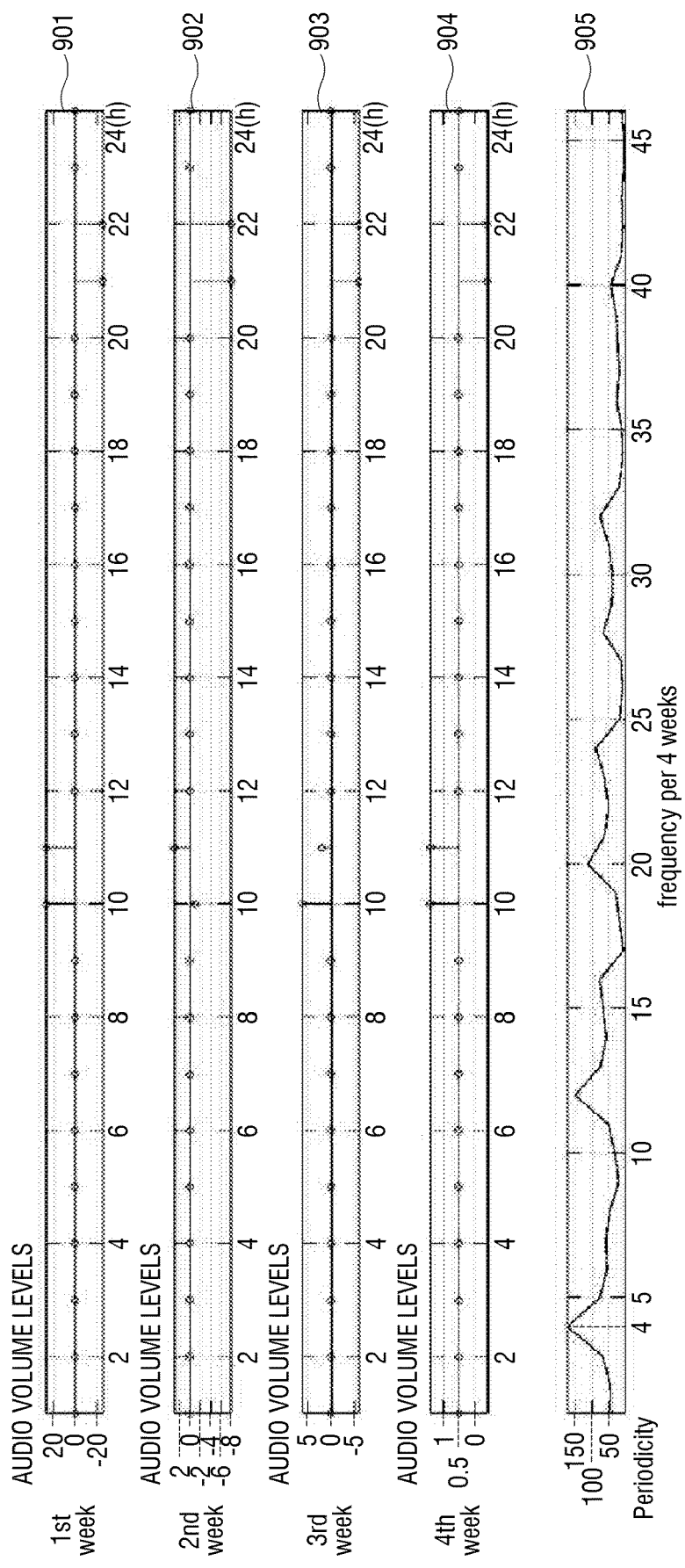
FIG. 9 illustrates an example of identifying a pattern according to another embodiment of the disclosure.

In the foregoing, as the method of identifying whether the changing pattern of the audio volume levels is present, the presence of the pattern is identified according to whether a deviation among a plurality of volume levels corresponding to a certain cycle and a predetermined unit time is not greater than a predetermined value. However, the method of identifying the presence of the pattern is not limited to this example. Another example of identifying the presence of the pattern will be described with reference to FIG. 9.

The processor 202 of the electronic apparatus according to another embodiment of the disclosure may apply the Fourier transform to the history of the audio volume levels. For example, the processor 202 may perform the Fourier transform corresponding to a total number of audio volume levels for a predetermined period of time. Specifically, when the volume-level setting history information 251 is given in the form of the table as shown in FIG. 7, a total of 96 volume history values corresponds to a specific day for a predetermined period of time, i.e. one month. Here, the reason why an example of considering only the total number of volume history values corresponding to the specific day is given is merely to estimate the length of the cycle with respect to one week, and it does not always have to obtain the total number of volume history values corresponding to the specific day when the total number of volume history values is calculated.

For example, when the volume history values corresponding to each unit time of each week are collected with respect to Sunday, data is obtained as much as a total of 96 samples (=24 hours×4 weeks) as shown in the graphs 901, 902, 903 and 904. The processor 202 may perform the 96-point Fourier transform. The result of the 96-point Fourier transform is shown in the graph 905. The processor 202 identifies that the maximum value is at the fourth frequency, and thus a component repeated four times has the greatest value. Because a predetermined period of time is one month, i.e. four weeks, the processor 202 identifies that a component repeated four times for four weeks, i.e. the data has a weekly pattern.

As described above, the processor 202 of the electronic apparatus according to this embodiment of the disclosure may identify a pattern based on the result of applying the Fourier transform to the history of the audio volume levels.

The processor 202 of the electronic apparatus according to still another embodiment of the disclosure may employ the foregoing pattern identification methods together. For example, the processor 202 identifies whether there is a pattern based on the result of applying the Fourier transform to a history of audio volume levels, identifies the length of the cycle when the pattern is present (i.e. the pattern identification based on the Fourier transform), and identifies whether a deviation among the plurality of volume levels corresponding to a predetermined unit time in the corresponding cycle is not greater than a predetermined value based on the information about the identified length of the cycle (i.e. the pattern identification based on the statistical characteristic), thereby identifying the unit time in which there is a pattern repeated per length of the cycle identified above. That is, the Fourier transform is used to identify whether a pattern is present and identify a length of a cycle when there is the pattern, and then the unit time having the pattern in the cycle is specifically identified based on the identified length of the cycle. Thus, it is possible to rapidly identify presence of a pattern, a length of the cycle, and a unit time having a pattern.

The processor 202 of the electronic apparatus according to still another embodiment of the disclosure may not only employ the forgoing pattern identification methods at the same time, but also adjust a variable used in one method based on a result of applying the other method, thereby improving the reliability of the pattern identification. This will be described with reference to FIG. 10.

Figure 10:
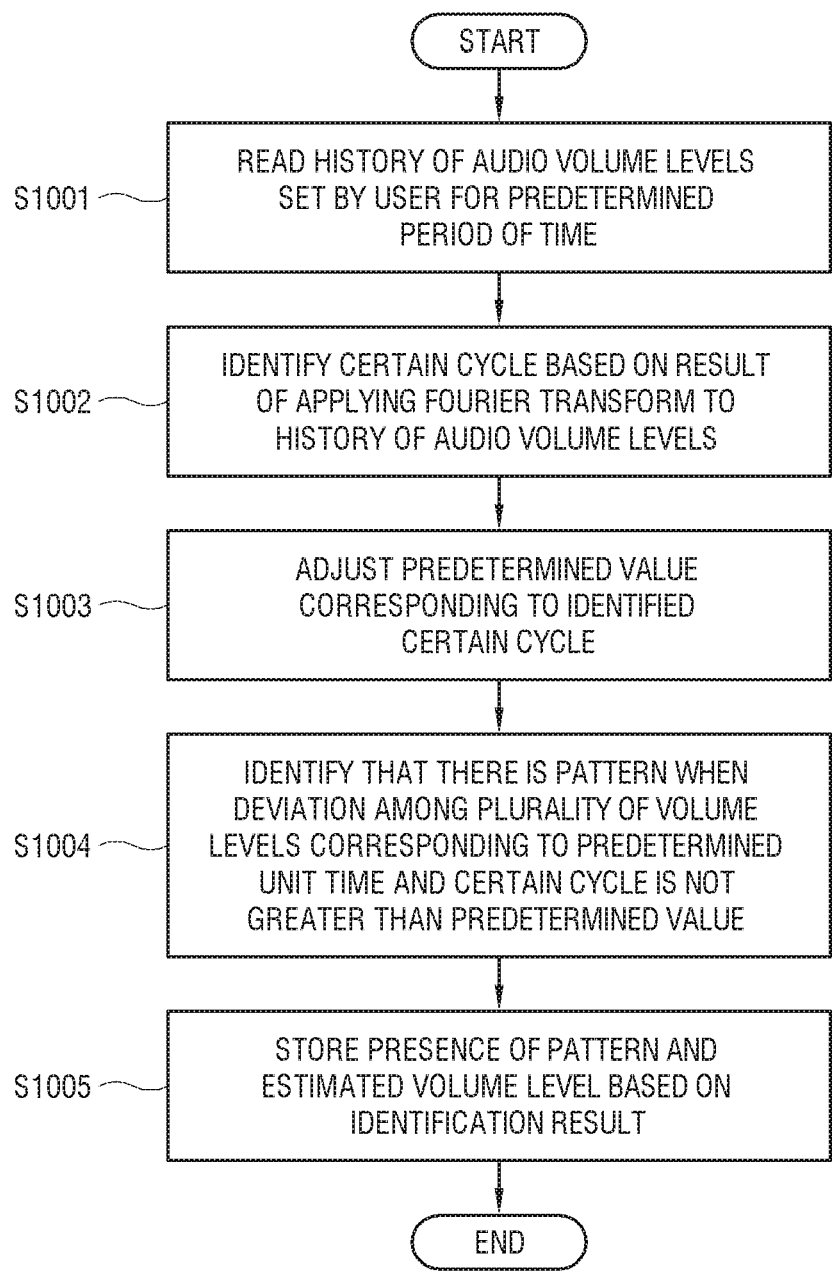
FIG. 10 illustrates a method of controlling an electronic apparatus according to another embodiment of the disclosure.

FIG. 10 illustrates a method of controlling an electronic apparatus according to still another embodiment of the disclosure. The processor 202 of the electronic apparatus according to this embodiment of the disclosure reads a history of audio volume levels set by a user for a predetermined period of time (S1001). The processor 202 apply the Fourier transform to the read history of the audio volume levels (S1002). Based on the result of applying the Fourier transform, the processor 202 may identify whether the history has a pattern and identify a length of a cycle of the pattern. Then, the processor 202 may adjust a predetermined value used as a criterion for identifying a deviation among the plurality of volume levels corresponding to the identified length of the cycle (S1003), and identify the presence of the pattern by identifying whether the deviation among the plurality of volume levels corresponding to a predetermined unit time and a certain cycle is not greater than the adjusted predetermined value (S1004).

For example, when it is identified based on the result of applying the Fourier transform to the history of the audio volume levels that a weekly repeated pattern is present in the history, the processor 202 may identify whether the deviation among the plurality of volume levels corresponding to a predetermined unit time in a weekly cycle is not greater than the predetermined value. In this case, it has already been identified that there is a weekly repeated pattern, and therefore it is possible to improve the reliability of identifying the unit time having the pattern by setting the predetermined value greater than a predetermined value set on the assumption that no patterns are present. When a predetermined value is too small, the deviation among the plurality of volume levels corresponding to a certain unit time may exceed the predetermined value even though a weekly pattern emerges as a result of using the Fourier transform, and thus a unit time having a pattern may not be identified.

Like this, in terms of identifying that there is a pattern when a deviation among a plurality of volume levels corresponding to a certain cycle and a predetermined unit time does not exceed a predetermined value, the processor 202 of the electronic apparatus according to this embodiment of the disclosure identifies the certain cycle based on the result of applying the Fourier transform to the history of the audio volume levels, and adjust the predetermined value corresponding to the identified certain cycle. Thus, it is possible to further improve the reliability of the pattern identification.

Figure 11:
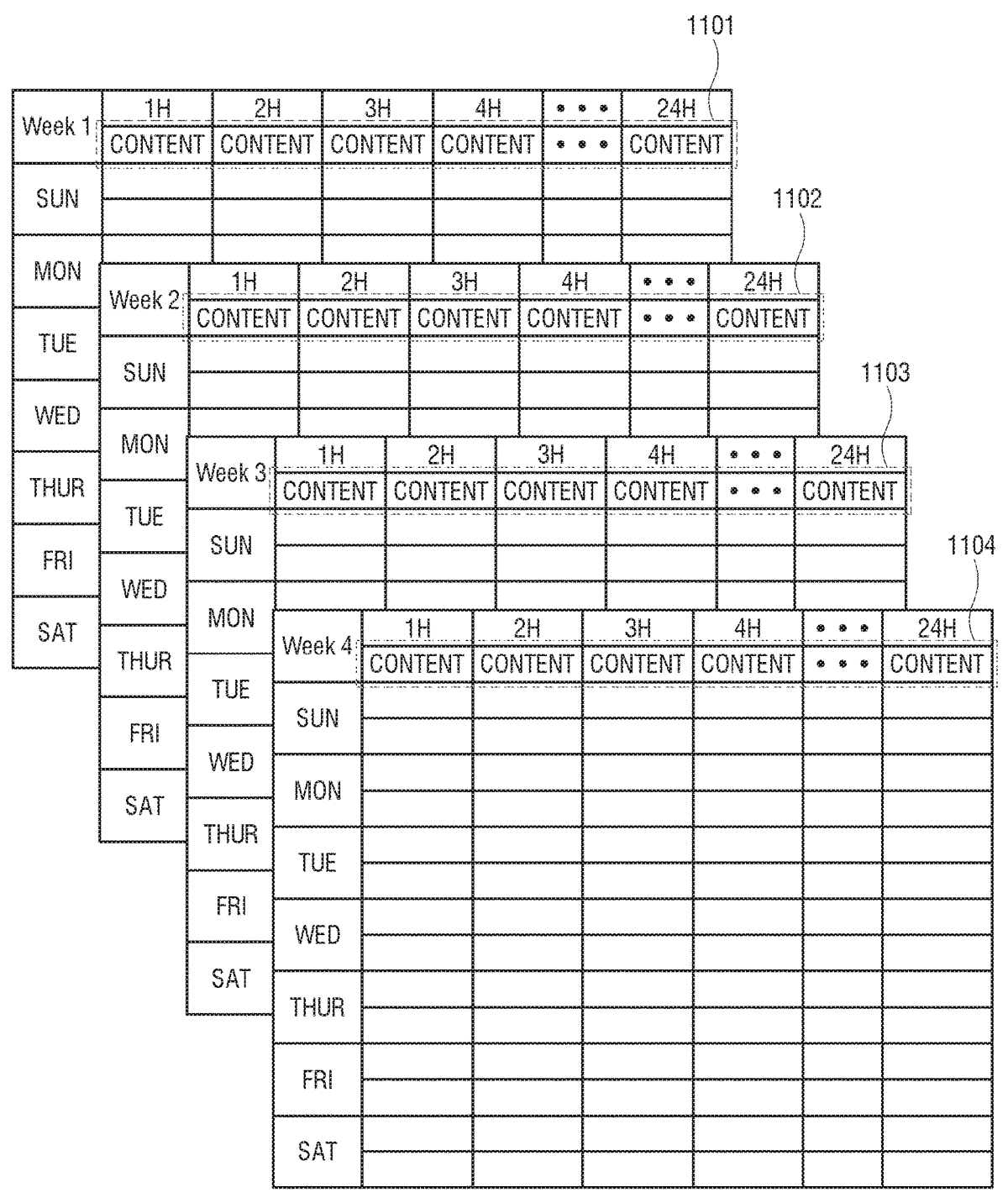

FIG. 11 illustrates an example of a volume-level setting history according to still another embodiment of the disclosure. The volume-level setting history according to this embodiment of disclosure may further include information about content.

Referring to FIG. 11, specifically, the volume-level setting history information according to this embodiment of the disclosure may further include information about content reproduced when the corresponding volume is set, in addition to a representative volume level with respect to each unit time (1101-1104). In this case, the pattern identification may be performed excluding volume-level history data different in the kind of content from other data, in terms of identifying whether a pattern is present in a volume-level setting history by the foregoing methods, for example, when it is identified whether a deviation among a plurality of volume levels corresponding to a certain cycle and a predetermined unit time is not greater than a predetermined value or when a pattern is identified based on a result of applying the Fourier transform to a history of audio volume levels. Thus, the volume-level history information of when different kinds of content is reproduced is identified as noise, and excluded when a pattern is identified, thereby improving the reliability of the pattern identification.

Figure 12:
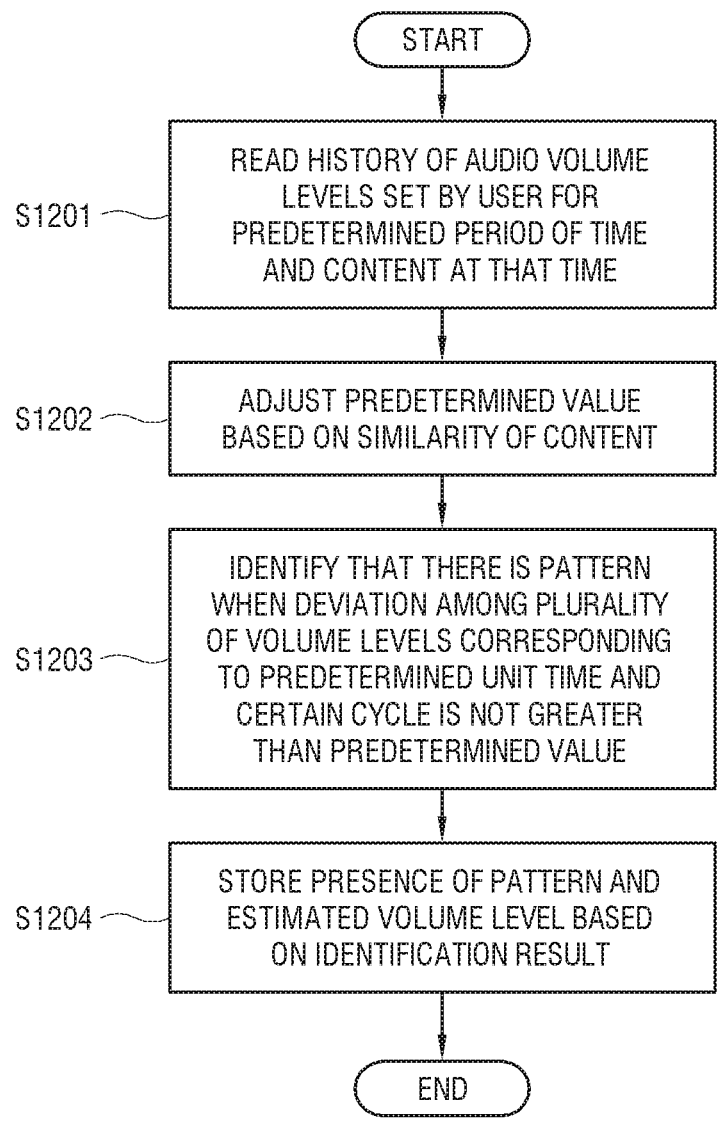
FIG. 12 illustrates a method of controlling an electronic apparatus according to still another embodiment of the disclosure.

FIG. 12 illustrates a method of controlling an electronic apparatus according to still another embodiment of the disclosure. The processor 202 of the electronic apparatus according to this embodiment of the disclosure may adjust an identification criterion at pattern identification with respect to a volume level history of the same content. This will be described with reference to FIG. 12.

The processor 202 of the electronic apparatus according to this embodiment of the disclosure reads an audio volume level set by a user for a predetermined period of time and a history of content reproduced at that time (S1201). The processor 202 may adjust a predetermined value based on similarity of the read content, in terms of identifying a pattern according to whether a deviation among a plurality of volume levels corresponding to a certain cycle and a predetermined unit time is not greater than a predetermined value (S1202). As a method of adjusting a predetermined value, the predetermined value may be increased or decreased. The predetermined value may be increased when it is basically identified that the volume history information about the similar content is highly likely to have a pattern. On the other hand, the predetermined value may be decreased when it is desired to apply a stricter pattern identification criterion to the volume history information about the similar content.

After adjusting a predetermined value, the processor 202 identifies a pattern according to whether the deviation among the plurality of volume levels corresponding to the certain cycle and the predetermined unit time is not greater than a predetermined value (S1203). The processor 202 stores the presence of the pattern and the estimated volume level based on a result of identification (S1204).

Thus, the pattern identification criterion is adjusted according to the similarity of the content at the pattern identification, thereby improving the reliability of the pattern identification.

Figure 13:
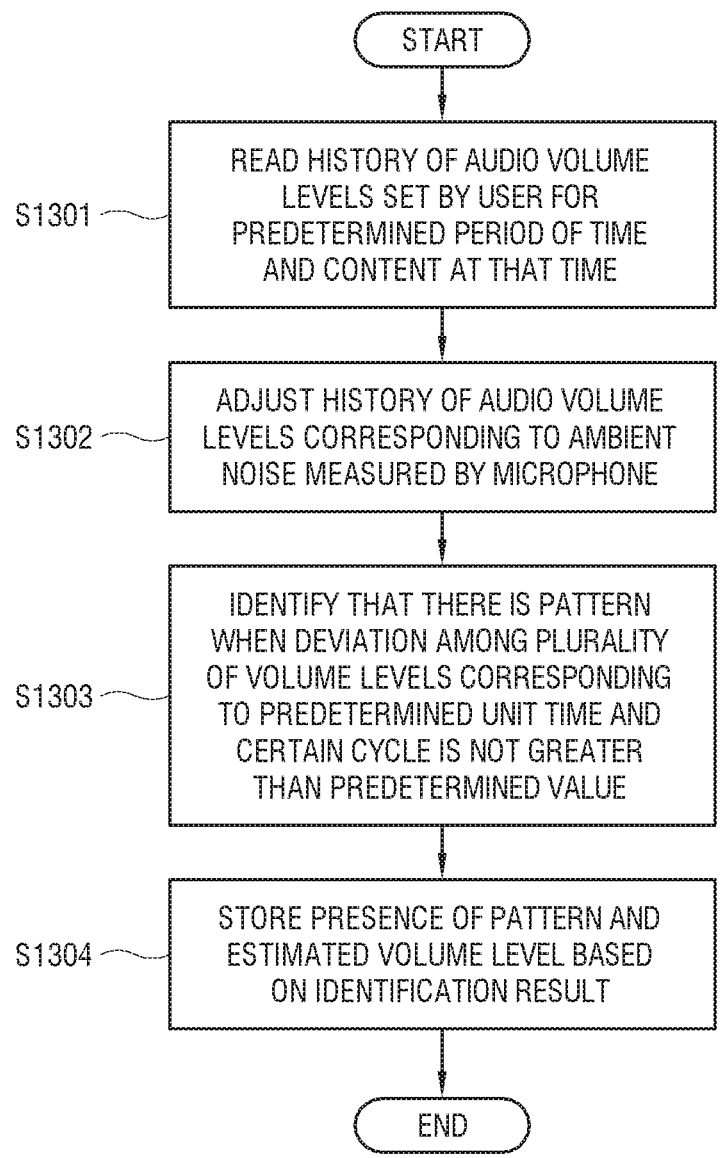
FIG. 13 illustrates a method of controlling an electronic apparatus according to still another embodiment of the disclosure.

FIG. 13 illustrates a method of controlling an electronic apparatus according to still another embodiment of the disclosure. The processor 202 of the electronic apparatus according to this embodiment of the disclosure may perform pattern identification after a volume level is controlled based on ambient noise measured by a microphone or the like. This will be described with reference to FIG. 13.

The processor 202 of the electronic apparatus according to this embodiment of the disclosure reads an audio volume level set by a user for a predetermined period of time and a history of content reproduced at that time (S1301). Then, the processor 202 adjusts the history of the audio volume levels based on the ambient noise measured by the microphone (S1302). For example, when it is identified that noise is loud as a result of measuring the ambient noise of the electronic apparatus through the microphone, the processor 202 may identify that an audio volume level set at that time is increased corresponding to the noise rather than the pattern, and thus controls the volume level to be turned down.

Next, the processor 202 identifies presence of a pattern when a deviation among a plurality of volume levels corresponding to a certain cycle and a predetermined unit time is not greater than a predetermined value (S1303), and stores the presence of the pattern and an estimated volume level based on a result of identification (S1304).

Thus, the pattern is identified after controlling the volume level based on the ambient noise measured by the microphone or the like, and therefore accuracy of data used as a criterion of identifying the pattern is improved, thereby improving the reliability of the identified pattern.

FIG. 14 illustrates an example of a volume-level setting history according to still another embodiment of the disclosure. The electronic apparatus according to this embodiment of the disclosure may identify a pattern by excluding some pieces of information from information about a history of audio volume levels according to whether the electronic apparatus is in a preset operation state. For example, the volume-level setting history according to this embodiment of the disclosure further includes information about cases where the electronic apparatus does not operate for reasons of being turned off or the like, thereby further providing additional information for filtering out a history inappropriate to identify the pattern. This will be described with reference to FIG. 14.

A volume-level setting history shown in FIG. 14 includes information about a case where the electronic apparatus is powered off. For example, in volume level history information 1401-1404 corresponding a unit time at 1:00 on Sunday, history information corresponding to the second week 1402 and the fourth week 1404 shows that the electronic apparatus is powered off at those time. Therefore, in terms of identifying whether volume levels are patterned with respect to the unit time at 1:00 on Sunday, the processor 202 may identify a pattern based on history information about other weeks except the second week 1402 and the fourth week 1404, for example, history information about the first week, the third week, the fifth week, the sixth week, the seventh week, etc. That is, the volume level corresponding to each unit time does not have to be continuous information in a certain cycle.

Thus, the pattern is identified under the condition that information unrelated to a user's setting intention is excluded from the history of the audio volume levels, thereby improving the reliability of the pattern identification.

What is claimed is:
1. An electronic apparatus comprising:
a user input unit;
an audio output unit;
a storage; and
a processor configured to:
  store in the storage history information about a plurality of audio volume levels set by a user for a predetermined period of time, each of the plurality of audio volume levels corresponding to a predetermined unit of time,
  identify whether a pattern of the plurality of audio volume levels is present based on the stored history information by detecting whether the plurality of audio volume levels corresponding to the predetermined unit of time is periodic for a timeslot,
  based on presence of the pattern of the plurality of the audio volume levels, perform automatic volume-level control, by which an audio volume level of the audio output unit is controlled based on the pattern of the plurality of the audio volume levels, and
  based on absence of the pattern of the plurality of the audio volume levels, perform no automatic volume-level control.

2. The electronic apparatus according to claim 1, wherein the processor is configured to:
identify whether the pattern of the plurality of audio volume levels is present in a certain cycle with respect to the predetermined unit of time, and
perform the automatic volume-level control based on the presence of the pattern with respect to the predetermined unit of time corresponding to a current point in time, based on an operation of the electronic apparatus carried out in the current point in time.

3. The electronic apparatus according to claim 2, wherein the processor is configured to identify the presence of the pattern based on a deviation among the plurality of the audio volume levels corresponding to the certain cycle and the predetermined unit of time being not greater than a predetermined value.

4. The electronic apparatus according to claim 3, wherein the processor is configured to:
identify the certain cycle based on a result of applying Fourier transform to the history information, and
adjust the predetermined value based on the identified certain cycle.

5. The electronic apparatus according to claim 3, wherein the processor is configured to adjust the predetermined value based on similarity of a content.

6. The electronic apparatus according to claim 1, wherein the processor is configured to identify the presence of the pattern based on a result of applying Fourier transform to the history information.

7. The electronic apparatus according to claim 1, wherein the processor is configured to identify the pattern based on the history information including a characteristic of the plurality of audio volume levels of a similar content.

8. The electronic apparatus according to claim 7, further comprising a microphone,
wherein the processor is configured to identify the pattern based on the history information including a characteristic of the plurality of audio volume levels adjusted corresponding to ambient noise measured using the microphone.

9. The electronic apparatus according to claim 1, wherein the processor is configured to identify the pattern by excluding some pieces of information from the history information according to whether the electronic apparatus is in a preset operation state.

10. A method of controlling an electronic apparatus, comprising:
storing history information about a plurality of audio volume levels set by a user for a predetermined period of time, each of the plurality of audio volume levels corresponding to a predetermined unit of time;
identifying whether a pattern of the plurality of audio volume levels is present based on the stored history information by detecting whether the plurality of audio volume levels corresponding to the predetermined unit of time is periodic for a timeslot;
based on presence of the pattern of the plurality of the audio volume levels, performing automatic volume-level control, by which an audio volume level of an audio output unit is controlled based on the pattern of the plurality of the audio volume levels; and
based on absence of the pattern of the plurality of the audio volume levels, performing no automatic volume-level control.

11. The method according to claim 10, further comprising:
identifying whether the pattern of the plurality of audio volume levels is present in a certain cycle with respect to the predetermined unit of time, and
performing the automatic volume-level control based on the presence of the pattern with respect to the predetermined unit of time corresponding to a current point in time, based on an operation of the electronic apparatus carried out in the current point in time.

12. The method according to claim 11, wherein the identifying whether the pattern of the plurality of audio volume levels is present comprises identifying the presence of the pattern based on a deviation among the plurality of the audio volume levels corresponding to the certain cycle and the predetermined unit of time being not greater than a predetermined value.

13. The method according to claim 12, further comprising:
identifying the certain cycle based on a result of applying Fourier transform to the history information, and
adjusting the predetermined value based on the identified certain cycle.

14. The method according to claim 12, further comprising adjusting the predetermined value based on similarity of a content.

15. The method according to claim 10, wherein the identifying whether the pattern of the plurality of audio volume levels is present comprises identifying the presence of the pattern based on a result of applying Fourier transform to the history information.

16. The method according to claim 10, wherein the identifying whether the pattern of the plurality of audio volume levels is present comprises identifying the pattern based on the history information including a characteristic of the plurality of the audio volume level of a similar content.

17. The method according to claim 16, wherein the electronic apparatus comprises a microphone, and
the identifying whether the pattern of the plurality of audio volume levels is present comprises identifying the pattern based on the history information including a characteristic of the plurality of audio volume levels adjusted corresponding to ambient noise measured using the microphone.

18. The method according to claim 10, wherein the identifying whether the pattern of the plurality of audio volume levels is present comprises identifying the pattern by excluding some pieces of information from the history information according to whether the electronic apparatus is in a preset operation state.

19. A non-transitory computer-readable medium storing a computer program which, when executed by a processor of an electronic apparatus, causes the processor to control the electronic apparatus to:
store history information about a plurality of audio volume levels set by a user for a predetermined period of time, each of the plurality of audio volume levels corresponding to a predetermined unit of time;
identify whether a pattern of the plurality of audio volume levels is present based on the stored history information by detecting whether the plurality of audio volume levels corresponding to the predetermined unit of time is periodic for a timeslot;
based on presence of the pattern of the plurality of the audio volume levels, perform automatic volume-level control, by which an audio volume level of an audio output unit is controlled based on the pattern of the plurality of the audio volume levels; and
based on absence of the pattern of the plurality of the audio volume levels, perform no automatic volume-level control.

20. The non-transitory computer-readable medium according to claim 19, wherein the non-transitory computer-readable medium is included in a server and the program is downloadable into the electronic apparatus through a network.

* * * * *